United States Patent Office 3,736,170

Patented May 29, 1973

3,736,170

PROCESS FOR IMPROVED ADHESION OF ELECTROLESS COPPER TO A POLYIMIDE SURFACE

John C. Lo, Endwell, and Michael T. Orinik, Binghamton, N.Y., assignors to International Business Machines Corporation, Armonk, N.Y.

No Drawing. Filed June 28, 1971, Ser. No. 157,626
Int. Cl. B44d *1/092;* C23b *5/64*
U.S. Cl. 117—47 A 9 Claims

ABSTRACT OF THE DISCLOSURE

A polyimide surface is prepared for metal plating by immersion in a quaternary ammonium hydroxide compound solution such as, benzyl trimethyl ammonium hydroxide, tetramethyl ammonium hydroxide, tetraethyl ammonium hydroxide and the like The resultant hydrolyed sulface is activated by immersion in a solution of high fluoride ion concentration such as, KF, NaF, or HF and thereafter immersed in an electroless deposition bath for metal plating thereon. The reusltant metal film is found to be strongly bonded to the polyimide surface.

BACKGROUND OF THE INVENTION

The present invention is directed to a method for effecting a strong metal bond to polyimide surfaces. More specifically, the invention is directed to a method of treating polyimide surfaces in a quaternary ammonium hydroxide solution and thereafter activating the surface with fluoride ions prior to the deposition of a metal film thereon.

PRIOR ART

Polyimide polymers possess physical and chemical properties which make them outstanding candidates as dielectrics in the electronic industries. The polyimides are not only resistant to high temperatures but are also resistant to most chemicals. However, the inhereent inertness of polyimide polymers render them non-reactive toward conventional electroless metal deposition. It is known to hydrolize the surface of polyimides with inorganic hydroxide such as KOH and NaOH to obtain the polyamic acids. However, because of the difficulty of controlling the surface hydrolysis it is found that this technique leads to poor adhesion of metals deposited thereon.

U.S. Pat. 3,361,589, directed to the treatment of polyimide surfaces for improvement of receptivity and adherence to adhesives, teaches the combination of a basic compound such as the alkali metal hydroxides together with a quaternary ammonium hydroxide. While the method disclosed therein shows an improved adhesion of adhesives, this method of surface treatment together with conventional methods of sensitizing, has failed to provide good adhestion between the polyimide surface and metals. That is, in nearly every case, the metal film is readily peeled from the surface of the polyimide by using a very unsubstantial amount of force and in some instances actually falls off the surface of the polyimide into the electroplating solution.

SUMMARY OF THE INVENTION

There is provided a method for the metal deposition on polyimide surfaces which includes the treating of the surface of a polyimide film with a quaternary ammonium hydroxide solution and with fluoride ions. Stepwise the method is comprised of immersing the polyimide film in from about a 10% to about 40% solution of a quaternary ammonium hydroxide for about 10 minutes to about 1 hour. The polyimide film is then activated by immersing the same in a solution of high fluoride ion concentration such as that of KF, NaF or HF. The treatment can range from about 10 to 30 minutes in a 48% solution to a nearly saturated solution of the fluoride salts. The so-treated film is thereafter immersed in a conventional electroless metal plating bath to deposit a strongly adhering metal onto the surface thereof. The film is then subjected to electroplating at a current density of 20 amperes/ft.$^2$ for 1 hour to provide an adequate metal thickness for pull test. Metal films having peel strength in the order of 3.5 to 4.6 lbs./inch are obtained by this treatment as opposed to peel strength of 0–1 lb./inch for films treated by conventional prior art methods.

OBJECTS OF THE INVENTION

Accordingly, it is an object of this invention to provide for improved adhesion of metal films to a polyimide surface.

In addition, it is another object of the invention to provide a method for treating the surface of a polyimide film prior to metal deposition thereon.

It is a further object of the invention to provide a method which is featured by the step of treating the surface of a polyimide film with fluoride ions.

PREFERRED EMBODIMENTS OF THE INVENTION

The objects of this invention are achieved according to the process for depositing a strongly adhering film to a polyimide surface. The process for depositing the strongly adhering metal comprises the steps of:

(1) Immersing a polyimide film in from about a 10% to about 40% solution of a quaternary ammonium hydroxide for about 10 minutes to about 60 minutes.

(2) Removing the film from said quaternary ammonium hydroxide solution and immersing it in a solution prepared from a fluoride ion containing compounds selected from the group consisting of K, NaF or HF, said solution being in the range of about 48% to about saturation.

(3) Rinsing the treated polyimide film in water.

(4) Immersing said film in a conventional electroless metal bath to deposit a metal film thereon and thereafter.

(5) Immersing the metal cladded film in an electrolytic plating bath to electrically deposit more metal on said film.

DETAILED DESCRIPTION OF THE INVENTION

The process of this invention involves the hydrolysis of the polyimide film to form a surface layer of polyamic acid. The surface layer is then activated with fluoride ions.

The polyimide is hydrolyzed to polyamic acid, also designated in the art as polyamide acid, in accordance with the general formula comprising recurring units as shown below:

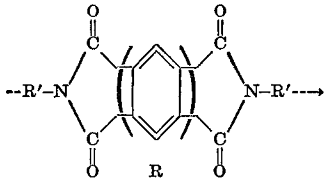

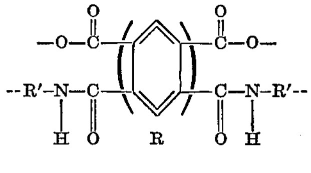

where R is an organic tetravalent radical containing at least 2 carbon atoms with no more than two of the carbonyl groups being attached to the same carbon atom of R, wherein R′ is a divalent radical containing at least 2 carbon atoms.

The quaternary ammonium hydroxides have the general formula:

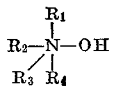

where $R_1$ and $R_2$ are the same or different alkyl radicals of 1–4 carbons, $R_3$ is alkyl of 1–18 carbons or alkenyl of 1–18 carbons and $R_4$ is alkyl of 1–18 carbons, alkenyl of 1–18 carbons, phenyl, alkylphenyl where the alkyl portion has 1–18 carbons, benzyl or alkylbenzyl where the alkyl portion has 1–18 carbons. Representative quaternary ammonium hydroxides useful in accordance with the present invention are the following:

tetramethyl ammonium hydroxide
tetraethyl ammonium hydroxide
tetrabutyl ammonium hydroxide
benzyl trimethyl ammonium hydroxide
phenyl trimethyl ammonium hydroxide
dodecyl trimethyl ammonium hydroxide
hexadecyl trimethyl ammonium hydroxide
octadecyl trimethyl ammonium hydroxide
dodecyl triethyl ammonium hydroxide
hexadecyl triethyl ammonium hydroxide
octadecyl triethyl ammonium hydroxide
dodecyl tri-n-propyl ammonium hydroxide
dodecyl tri-isopropyl ammonium hydroxide
benzyl dimethyl hexadecyl ammonium hydroxide
dimethyl etheyl hexadecyl ammonium hydroxide
p-dodecylbenzyl trimethyl ammonium hydroxide
benzyl dimethyl octadecyl ammonium hydroxide Preferred fluoride ions containing compounds for this invention are KF, NaF and HF.

The quaternary ammonium hydroxide solution is prepared preferably in water and/or in alcohol. The solution will have a pH of at least about 12–13 in $H_2O$. The concentration of the solution can be from about 10% to 40% by weight of the quaternary ammonium hydroxide.

The duration of the immersion in the quaternary ammonium hydroxide solution can vary from as short as about 10 minutes to about 60 minutes at room temperature. Selection of the particular concentration nad duration to be used on any given polyimide will be interdependent ad readily determinable by persons skilled in the art. Surface activation of the hydrolyzed surface is performed in a solution of high fluoride ion concentration. Preferred fluoride compounds are the potassium fluoride, sodium fluoride or hydrofluoric acid. Hydrofluoric acid is the most preferred reagent. The fluoride solutions can be in the range of 48% to saturated solutions of the fluoride salts. The polyimide surface is permitted to remain in the fluoride solution from 10 to about 30 minutes. Polyimide polymers used in this invention are prepared from pyromellitic dianhydride and bis(4-aminophenyl) ether. They are available commercially under the tradename Kapton, manufactured by the DuPont Corp.

Prior to the surface hydrolysis, the polyimide films can be given a wet aluminum oxide surface roughening or other conventional roughening. The instant invention may be further carried out by using any conventional aqueous electroless metal plating bath solution, for example, a nickel or copper electroless bath may be used. An example of one suitable copper plating bath is as follows:

| Component | Lower limit | Upper limit |
|---|---|---|
| Copper sulfate pentahydrate, g./gal | 165 | 175 |
| Formaldehyde (37%), ml./gal | 1,880 | 1,900 |
| Nickel chloride hexahydrate, g./gal | 63 | 72 |
| Sodium hydroxide, g./gal | 152 | 162 |
| Rochelle salts, g./gal | 695 | 710 |
| Sodium carbonate, g./gal | 68 | 77 |

A typical electroless Ni bath may be prepared as follows:

| | | |
|---|---|---|
| 2 $NiCo_3 \cdot 3Ni(OH)_2 4H_2O$ | g./l. | 10 |
| HF (as of 50% HF) | ml./l. | 6 |
| Citric acid | g./l. | 5.5 |
| $NH_4HF_2$ | g./l. | 10 |
| $NaH_2PO_2 \cdot H_2O$ | g./l. | 20 |
| $NH_4OH$ | ml./l. | 30 |
| pH | ° F. | 4.5–6.8 |
| Temperature | ° F. | 170–180 |

Any conventional electrolytic plating bath can similarly be used in furtherance of the invention.

The following examples are given in order to illustrate the process of this invention without intending to limit the scope of the invention thereby:

EXAMPLE I

A polyimide film is immersed in a 40% alcoholic solution of benzyl trimethyl ammonium hydroxide and is allowed to remain therein for about 10 minutes. The film is removed and washed with water and immersed in a 48% solution of hydrofluoric acid for about 10 minutes. The film is again removed and rinsed with water and thereafter immersed in a conventional metal electroless plating bath such as hereinabove described, for about 20 minutes. It was found that a well-adhered copper coating of about 0.00025 inches thick was deposited on the polyimide film. The film is then immersed in a conventional electrolytic metal bath such as hereinabove described for a time sufficient to deposit a metal film of desired thickness. Adhesion measurements on the plated metal film is made on a Diventco pull tester. The metal film was found to have a pull strength of about 4.6 lbs./inch.

EXAMPLE II

The method of Example I is repeated except that a 10% aqueous solution of the benzyl trimethyl ammonium hydroxide was used and immersion therein was maintained for about 1 hour. Adhesion measurements gave a pull strength of about 4.0 lbs./inch.

EXAMPLE III

The method of Example I is repeated except that a 40% alcoholic solution of tetramethyl ammonium hydroxide is used and immersion therein is for about 10 minutes. Surface activation is obtained by the immersion and saturated solution of KF. Immersion of the film in the KF solution is for about 30 minutes. Adhesion measurements indicated pull strength of the order of 4.6 lbs./inch.

EXAMPLE IV

The process of Example III is repeated except that a saturated solution of NaF was used as the activation solution. The hydrolyzed film was immersed in the sodium fluoride solution for about 10 minutes. Adhesion measurements indicated a pull strength of about 3.5 lbs./inch. The following table is illustrative of several examples showing various combinations of quaternary ammonium hydroxide solutions used in combination with various activation solutions, as well as KOH and NaOH in combination with $F^-$ ion activators. The pull strength of each sample is shown:

| Ex. No. | Hydrolyzing agent | Activating agent | Pull test, lbs./in. |
|---|---|---|---|
| 5 | Tetramethyl ammonium hydroxide | HF | 4.6 |
| 6 | do | KF | 4.4 |
| 7 | do | NaF | 4.5 |
| 8 | Tetraethyl ammonium hydroxide | HCl | 1.2 |
| 9 | do | HF | 4.6 |
| 10 | KOH | KF | 0.5 |
| 11 | Benzyl trimethyl ammonium hydroxide | HF | 4.4 |
| 12 | do | $CH_3COOH$ | 0.5 |
| 13 | do | KF | 4.5 |
| 14 | NaOH | KF | 1.0 |

For the purposes of comparison with the prior art, a polyimide film was immersed in a 10% alcoholic solution of potassium hydroxide for about 10 minutes at room temperature. The film was then washed with water and immersed in a 10% hydrochloric acid solution for 30 minutes, washed with water and dried. The so treated film was then immersed in the hereinabove mentioned conventional electroless plating bath for about 20 minutes. The film was then removed and it was noted that the deposited metal film peeled, indicating no adherence of the metal to the substrate.

The process of Example I was again repeated for purposes of comparison except that the activating solution was comprised of a 48% solution of hydrochloric acid. Adherence measurements were found to provide a pull strength of about 0 to 1 lb./inch. In another comparative example, the process of Example I was repeated with the exception that the activation of the surface is by conventional activating solutions. For example, an activating composition was prepared by dissolving two grams of $PdCl_2 \cdot 2H_2O$ in distilled water to which 40 cc. of concentrated reagent grade HCl was added. The substrate was immersed in the solution for 2 to 4 minutes, and subsequently plated as above. Adhesion measurements indicated pull strengths of 0 to 1 lb./inch.

What is claimed is:

1. A process for improving adhesion of metal films to a polyimide substrate surface comprising the steps of:
   (a) immersing said polyimide substrate into a quaternary ammonium hydroxide solution for a time sufficient to hydrolyze said surface,
   (b) immersing said substrate in a solution of high fluoride ion concentration for a time sufficient to activate said hydrolyzed surface and thereafter,
   (c) immersing said above treated substrate in a metal plating bath for a time sufficient to deposit a strongly adhering metal film thereon.

2. The process of claim 1 wherein said quaternary ammonium hydroxide is selected from the group consisting of:
   tetramethyl ammonium hydroxide, tetraethyl ammonium hydroxide, tetrabutyl ammonium hydroxide, benzyl trimethyl ammonium hydroxide, phenyl trimethyl ammonium hydroxide, dodecyl trimethyl ammonium hydroxide, hexadecyl trimethyl ammonium hydroxide, octadecyl trimethyl ammonium hydroxide, dodecyl triethyl ammonium hydroxide, hexadecyl triethyl ammonium hydroxide, octadecyl triethyl ammonium hydroxide, dodecyl tri-n-propyl ammonium hydroxide, dodecyl tri-isopropyl ammonium hydroxide, benzyl dimethyl hexadecyl ammonium hydroxide, dimethyl ethyl hexadecyl ammonium hydroxide, p-dodecylbenzyl trimethyl ammonium hydroxide, benzyl dimethyl octadecyl ammonium hydroxide.

3. The process according to claim 1 wherein said quaternary ammonim hydroxide solution is about a 10% to about a 40% solution.

4. The process according to claim 1 wherein said solution high fluoride ion concentration is a solution prepared from the group consisting of: HF, NaF and KF.

5. A process according to claim 1 wherein said solution of high fluoride concentration is about a 48% solution to about a saturated solution of fluoride ions.

6. A process according to claim 1 wherein said quaternary ammonium hydroxide solution is a 40% alcoholic solution of benzyl trimethyl ammonium hydroxide.

7. A process according to claim 1 wherein said quaternary ammonium hydroxide solution is a 10% aqueous solution of benzyl trimethyl ammonium hydroxide.

8. A process according to claim 1 wherein said quaternary ammonium hydroxide solution is a 40% alcoholic solution of tetramethyl ammonium hydroxide.

9. A process according to claim 1 wherein said substrate is immersed in said quaternary ammonium hydroxide solution for about 10 minutes to about 1 hour, and where said substrate is thereafter immersed in said solution of high fluoride ion concentration for about 10 minutes to about 30 minutes.

References Cited

UNITED STATES PATENTS

| | | | |
|---|---|---|---|
| 3,361,589 | 1/1968 | Lindsey | 117—118 |
| 3,075,823 | 1/1963 | Reyerson et al. | 117—118 |
| 2,982,053 | 5/1961 | Elmer | 117—118 |
| 3,567,594 | 3/1971 | Wells | 156—2 |
| 2,715,075 | 8/1955 | Wolinski | 117—47 A |

OTHER REFERENCES

IBM Tech. Disc. Bulletin, "Improved Adhesion Between Polyimide Surfaces" by Orinik,, vol. 13, No. 2, July 1970, p. 518.

WILLIAM D. MARTIN, Primary Examiner

W. R. TRENOR, Assistant Examiner

U.S. Cl. X.R.

117—118, 130 E, 138.8 N, 160 R